United States Patent Office 2,887,926
Patented May 26, 1959

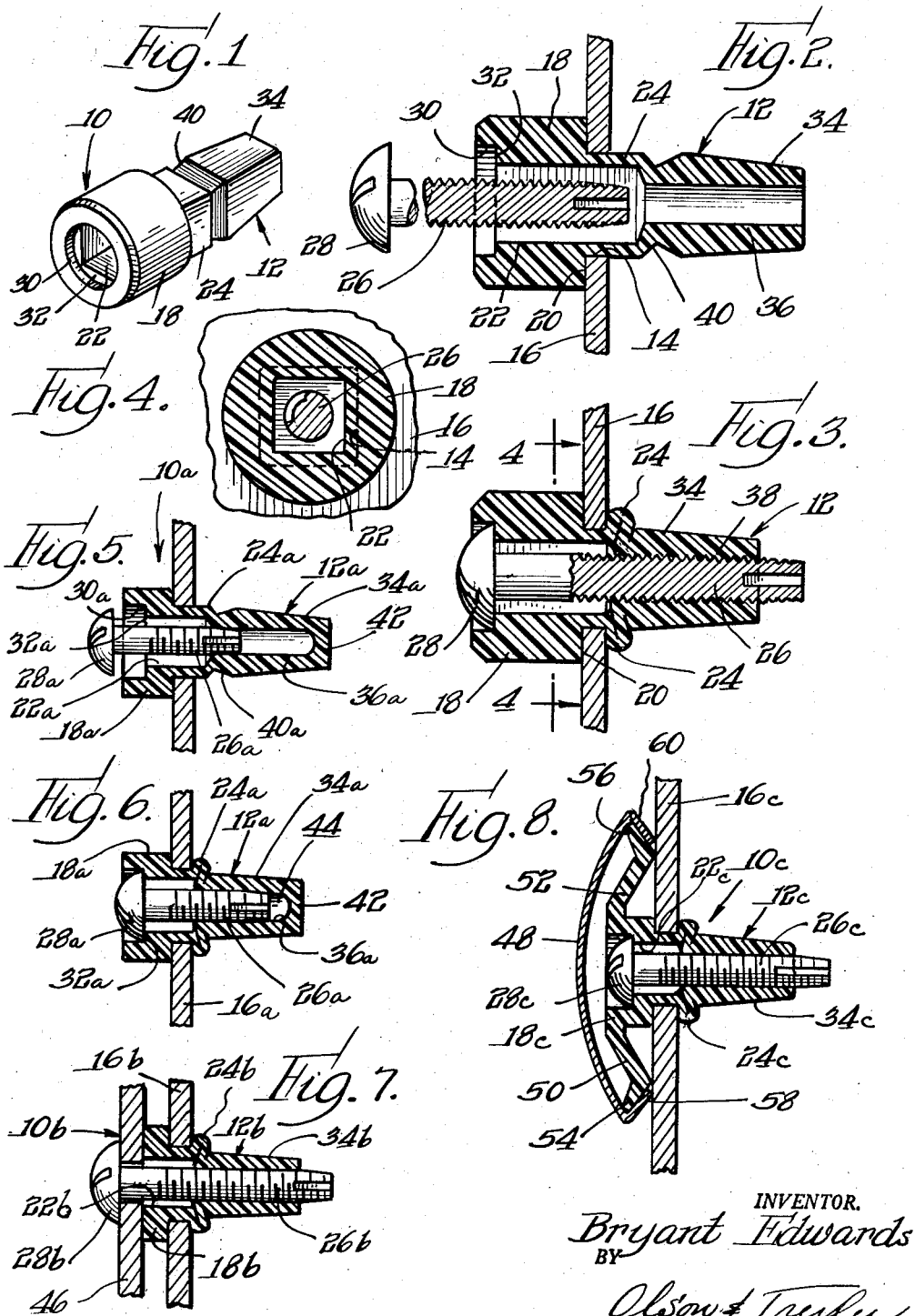

2,887,926

PLASTIC FASTENING DEVICE WITH FOLDABLE SHANK

Bryant Edwards, Oak Park, Ill., assignor to Illinois Tool Works, Chicago, Ill., a corporation of Illinois Application July 30, 1956, Serial No. 600,930

3 Claims. (Cl. 85—40)

The present invention relates to a novel fastening device or anchor member and more particularly, to a novel fastening device adapted to be applied to an apertured work structure.

An important object of the present invention is to provide a novel plastic fastening device or anchor member adapted to receive a screw or the like, which fastening device may be easily and securely applied to an apertured workpiece and is adapted effectively to seal the workpiece aperture.

A further object of the present invention is to provide a novel plastic fastening device or anchor member which is cooperable with a screw or the like and which may be easily inserted into an aperture in a workpiece without forcing and without radial collapsing of the anchor member and which is adapted to be securely connected with the workpiece upon application of a screw member or the like thereto.

A more specific object of the present invention is to provide a novel plastic fastening device or anchor member having a shank insertable into a workpiece aperture initially with a cross section not substantially greater throughout its length than the size of the workpiece aperture, which shank, upon application of a screw member or the like thereto, is adapted to be folded and expanded for securing the fastening device to the workpiece and for sealing the workpiece aperture.

A further specific object of the present invention is to provide a novel plastic fastening device or anchor member of the above described type adapted to receive a screw member or the like and adapted to maintain the screw member under tension so as to restrain unauthorized retrograde rotation of the screw member.

A further object of the present invention is to provide a novel preassembled unit including an anchor member or fastening device of the above described type and a screw member, which unit may be easily applied to an apertured workpiece and is securely retained in assembled relationship with the workpiece and effectively seals the workpiece aperture when the screw member is fully tightened.

Still another object of the present invention is to provide a novel fastening device or preassembled unit of the above described type which is non-rotatable within a workpiece aperture so that it may be easily applied from only one side of a workpiece.

Other objects and advantages of the present invention will become apparent from the following description and the accompanying drawings wherein:

Fig. 1 is a perspective view showing a fastening device or anchor member incorporating features of the present invention;

Fig. 2 is an enlarged partial sectional view showing the device of Fig. 1 partially assembled with an apertured workpiece and in condition to receive a cooperable screw member;

Fig. 3 is a sectional view similar to Fig. 2 but showing the fastening device fully applied to the workpiece;

Fig. 4 is a fragmentary sectional view taken along line 4—4 in Fig. 3;

Fig. 5 is a partial sectional view showing a preassembled unit of the present invention partially applied to an apertured workpiece and further showing a slightly modified form of the fastening device or anchor member;

Fig. 6 is a sectional view similar to Fig. 5 but showing the unit fully applied to the workpiece;

Fig. 7 is a partial sectional view showing another slightly modified form of the present invention in an assembly including a pair of spaced workpieces;

Fig. 8 is a partial sectional view showing another embodiment of the present invention wherein the fastening device or anchor member is modified so as to provide a molding retaining clip.

Referring now more specifically to the drawings wherein like parts are designated by the same numerals throughout the various figures, a fastening device or anchor member 10 incorporating the features of the present invention is shown in Figs. 1 through 4. This device is molded in one piece from any suitable tough resilient plastic material such, for example, as nylon.

The fastening device or anchor member 10 includes an axially extending shank portion 12 adapted to be inserted through an aperture 14 in a workpiece or panel 16. A head portion 18 is formed integrally with one end of the shank portion 12 and is provided with a generally radially extending face 20 adapted to abut the workpiece. It is to be noted that the transverse cross sectional shape of the shank portion 12 adjacent the head portion 18 is similar in size and configuration to the workpiece aperture 14 and that the transverse cross sectional shape of the remainder of the shank portion 12 is no larger than the shank cross section adjacent the head portion. This arrangement enables the shank portion to be slipped into the aperture 14 easily without forcing and without collapsing of the shank section and also facilitates sealing of the aperture in the manner described below. It is further to be noted that the configuration of the workpiece aperture and the transverse cross sectional configuration of the shank portion 12 are non-circular and, in the embodiment shown, rectangular so that when the shank is inserted within the aperture, it is retained against rotation.

A centrally located axially extending aperture 22 is provided through the head portion 18 and a section 24 of the shank portion adjacent the head portion, through which aperture a threaded shank 26 of a screw having a head portion 28 may be inserted. The outer end or mouth of the aperture 22 is enlarged or countersunk as at 30 for at least partially accommodating the head of the screw and for providing shoulder means 32 engageable with the screw head. The transverse cross sectional dimensions or area of the aperture 22 is greater than the diameter of the screw shank 26 so that the walls of the aperture 22 avoid threaded engagement with the screw shank. Furthermore, the transverse cross sectional configuration of the aperture 22 is preferably similar to that of the shank portion 24 so that the shank portion 24 has a substantially uniform and relatively thin and flexible uninterrupted wall entirely about its periphery. This facilitates folding of the shank portion wall 24 in the manner described below for securing the fastening device or anchor member to the workpiece and for sealing the workpiece aperture.

An entering end section 34 of the shank portion 12 is preferably provided with tapering sides in the manner shown for further facilitating application of the fastening device or anchor member to the apertured workpiece. This shank section is provided with a central axially extending bore 36 having a diameter similar to the minimum diameter of the thread cutting screw shank 26. Thus, when the screw member is fully applied as shown in Fig. 3, substantially full depth threads 38 are formed in the wall of the bore 36, which threads not only grip the screw shank but also provide a seal between the wall of the bore and the screw shank. A peripheral notch 40 is formed in the exterior surface of the shank section 34 adjacent the junction of the shank section 34 with the shank section 24 for promoting folding of the shank section 24 in the manner described below.

When using the fastening device or anchor member 10, it is first slipped into the workpiece aperture as shown in Figure 2. Then the screw member is inserted through the aperture 22 and is threaded into the bore 36 until the screw member head engages the shoulders 32. Further rotation of the screw member tends to draw the relatively thick walled entering end section 34 toward the head portion 18 and places the shank portion 24 under compressive forces. Continued rotation of the screw causes the shank section 24 to be axially collapsed or folded behind the workpiece 16 so that the folded portion of the shank section 24 engages and is tightly pressed against the back surface of the workpiece for effectively securing the fastener with respect to the workpiece and sealing the workpiece aperture. The inherent resiliency and toughness of the plastic material enables the thin walled shank section 24 to be folded in this manner without cracking or rupturing so that a good seal is assured. It will be appreciated that the resiliency of the plastic material tends to return the anchor member or fastening device to its original condition so that the screw shank is maintained under tension and the helical threads 38 of the anchor member aggressively engage the screw shank and restrain it against unauthorized retrograde rotation.

The fastening device or anchor member 10 is susceptible of a variety of uses. For example, the structure shown in Figs. 1 through 4 could be used in a refrigerator or other cabinet structure wherein the relatively large head portion 18 will provide a support for shelves or the like. Furthermore, the device of Figs. 1 through 4 could be used for securing a plurality of abutting apertured workpieces or panels together, which use is not illustrated, and when used in this manner, the shank section 24 should be lengthened, if necessary, so that it is substantially longer than the combined thicknesses of the panels.

Figs. 5 and 6 show a preassembled unit 10a which is similar to the structure described above as indicated by the application of identical reference numerals with the suffix "a" added to corresponding elements. In this embodiment, the screw member is preassembled with the fastening device or anchor member to an extent which is short of causing folding of the shank section 24a. It is to be noted that such preassembly may be accomplished without interfering with the ease of application of the device to an apertured workpiece since the transverse cross sectional shape of the shank section 24a does not become materially larger than the workpiece aperture until it is folded in the manner described above. In this embodiment, the plastic fastening device or anchor member is provided with a solid entering end 42 closing the bore 36a so as to completely eliminate any possibility of leakage through the bore and around the screw shank. As shown best in Fig. 6, the axial length of the screw shank 26a is substantially less than the distance between the head portion shoulder 32a and the entering wall 42 so that when the unit is fully applied to a workpiece, a pocket 44 is left between the screw shank and the end wall 42 for accommodating any chips which may be cut from the wall of the bore 36a by the thread cutting screw. It will be appreciated that, if desired, the screw member may be preassembled with the fastening device 10 described above as well as with the fastening devices or anchor members described below.

Fig. 7 shows another slightly modified form of the present invention which is similar to the above described structures as indicated by the application of identical reference numerals with the suffix "b" added to corresponding elements. In the assembly shown in this figure, the head portion 18b provides a spacer between the workpiece 16b and a second workpiece 46 which is secured in position by the head 28b of the screw member.

Fig. 8 shows another modified form wherein the fastening device or anchor member 10c provides a clip for mounting a molding strip 48 or the like on the workpiece or panel 16c. More specifically, wing sections 50 and 52 are formed integrally with an extension in opposite directions from the head portion 18c and respectively terminate in inclined flange portions 54 and 56 adapted to overlie and trap marginal flanges 58 and 60 of the molding strip 48.

While the preferred embodiments of the present invention have been shown and described herein, it is obvious that many structural details may be changed without departing from the spirit and scope of the appended claims.

The invention is claimed as follows:

1. A one-piece plastic fastening device comprising a shank insertable within an apertured workpiece, and a head at one end of said shank for overlying one side of a workpiece, and having an aperture extending axially therethrough, said shank including a first section at its entering end provided with an axial bore for threadedly receiving a screw member, said first shank section having a relatively great wall thickness, and said shank including a second foldable section positioned between the head and the first shank section and having a relatively small wall thickness which is defined internally by an aperture extending through said second shank section which is substantially larger than said first bore so as to assure sufficient radial spaced relation with respect to a screw member applied through said head, said second bore and into said first bore, application of a screw member through said head, said second bore and into said first bore serving to effect axial shifting of the second shank section toward said head in the form of an outwardly projecting fold for cooperation with the head to secure the fastening device with respect to a complementary workpiece, said first shank section having an annular peripheral notch therein with diverging sides located adjacent the junction of said first shank section with said second shank section, said annular notch having a depth to provide thereunder a transverse cross-sectional dimension of said first shank section which is substantially the same as the thickness of said second shank section, the axial thickness of the portion of shank stock between said notch and said second bore being substantially equal to the thickness of the wall defining said second bore whereby to facilitate folding of said second shank section as an incident to axial shifting of the first shank section toward the head when a screw is applied to the first bore, one side of said notch opposite from said foldable shank section being tapered and the adjacent portion of the annular space provided by the first bore being sufficient to cause outward bending of said portion of the shank stock at the bottom of the notch and to assure wedging of the shank stock portion into said annular space and the adjacent second wall portion within the complementary work aperture both radially and axially into sealing engagement with the adjacent surfaces of a workpiece when the screw member is fully applied.

2. A one-piece plastic fastening device as set forth in claim 1, wherein the second shank section is peripherally polygonal in transverse section.

3. A one-piece plastic fastening device as set forth in claim 1, wherein the outer portion of the head is countersunk for accommodating the head of a complementary screw element after said screw has been fully applied to said plastic fastening device.

References Cited in the file of this patent

UNITED STATES PATENTS

| | | |
|---|---|---|
| 2,017,421 | Post | Oct. 15, 1935 |
| 2,188,422 | Waner | Jan. 30, 1940 |
| 2,324,142 | Eklund | July 13, 1943 |
| 2,392,133 | Eklund | Jan. 1, 1946 |
| 2,545,514 | Erb | Mar. 20, 1951 |
| 2,762,252 | Karitzky | Sept. 11, 1956 |

FOREIGN PATENTS

| | | |
|---|---|---|
| 745,788 | Great Britain | Feb. 29, 1956 |